United States Patent
Wu et al.

(10) Patent No.: US 10,033,989 B2
(45) Date of Patent: Jul. 24, 2018

(54) SYNCHRONIZATION CONTROLLER FOR MULTI-SENSOR CAMERA DEVICE AND RELATED SYNCHRONIZATION METHOD

(71) Applicant: MEDIATEK INC., Hsin-Chu (TW)

(72) Inventors: Tung-Hai Wu, Taichung (TW); Wei-Cheng Ku, Hsinchu (TW); Chung-Hung Tsai, Hsin-Chu Hsien (TW); Yuan-Chung Lee, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 260 days.

(21) Appl. No.: 14/322,925

(22) Filed: Jul. 3, 2014

(65) Prior Publication Data

US 2015/0009288 A1    Jan. 8, 2015

Related U.S. Application Data

(60) Provisional application No. 61/843,221, filed on Jul. 5, 2013.

(51) Int. Cl.
    *H04N 13/00*    (2018.01)
    *H04N 13/02*    (2006.01)

(52) U.S. Cl.
    CPC ....... *H04N 13/0296* (2013.01); *H04N 13/025* (2013.01); *H04N 13/0239* (2013.01)

(58) Field of Classification Search
    CPC ........... H04N 13/0296; H04N 13/0239; H04N 13/025

See application file for complete search history.

(56) References Cited

U.S. PATENT DOCUMENTS

| 3,621,127 A | 11/1971 | Hope |
| 6,594,600 B1 | 7/2003 | Arnoul |

(Continued)

FOREIGN PATENT DOCUMENTS

| CN | 101273621 A | 9/2008 |
| CN | 101706957 | 5/2010 |

(Continued)

OTHER PUBLICATIONS

Xiameng Qin et al., Stereo Camera Calibration with an Embedded Calibration Device and Scene Features, p. 2306-2310, Dec. 11-14, 2012, Proceedings of the 2012 IEEE International Conference on Robotics and Biomimetics, Guangzhou, China.

(Continued)

*Primary Examiner* — Thai Tran
*Assistant Examiner* — Christopher T Braniff
(74) *Attorney, Agent, or Firm* — Winston Hsu

(57) ABSTRACT

A synchronization controller for a multi-sensor camera device includes a detection circuit and a control circuit. The detection circuit detects asynchronization between image outputs generated from the multi-sensor camera device, wherein the image outputs correspond to different viewing angles. The control circuit controls an operation of the multi-sensor camera device in response to the asynchronization detected by the detection circuit. In addition, a synchronization method applied to a multi-sensor camera device includes following steps: detecting asynchronization between image outputs generated from the multi-sensor camera device, wherein the image outputs correspond to different viewing angles; and controlling an operation of the multi-sensor camera device in response to the detected asynchronization.

16 Claims, 7 Drawing Sheets

(56) References Cited

U.S. PATENT DOCUMENTS

| | | | |
|---|---|---|---|
| 6,768,509 B1 | 7/2004 | Bradski | |
| 7,671,891 B2 | 3/2010 | Fitzgibbon | |
| 8,218,052 B2 † | 7/2012 | Upton | |
| 8,368,762 B1 | 2/2013 | Chen | |
| 8,717,422 B2 † | 5/2014 | Hewes | |
| 2004/0174439 A1* | 9/2004 | Upton | H04N 3/155 348/222.1 |
| 2006/0082879 A1 | 4/2006 | Miyoshi | |
| 2006/0204038 A1* | 9/2006 | Yokota | H04N 13/0239 382/104 |
| 2011/0242413 A1* | 10/2011 | Azzopardi | H04N 5/247 348/512 |
| 2012/0105591 A1 | 5/2012 | Kim | |
| 2012/0162511 A1* | 6/2012 | Hewes | H04N 13/0051 348/510 |
| 2012/0224032 A1 | 9/2012 | Takiguchi | |
| 2012/0242806 A1 | 9/2012 | Ibrahim | |
| 2012/0274627 A1 | 11/2012 | Huggett | |
| 2013/0163854 A1 | 6/2013 | Cheng | |
| 2013/0271579 A1 | 10/2013 | Wang | |
| 2014/0098194 A1* | 4/2014 | Goma | H04N 5/23212 348/47 |
| 2014/0307068 A1* | 10/2014 | Song | H04N 13/0402 348/54 |

FOREIGN PATENT DOCUMENTS

| | | |
|---|---|---|
| CN | 102033415 | 4/2011 |
| CN | 102227746 A | 10/2011 |
| CN | 102436660 A | 5/2012 |
| CN | 102638693 A | 8/2012 |
| CN | 102859989 A | 1/2013 |
| CN | 102860016 A | 1/2013 |
| CN | 103179413 A | 6/2013 |
| EP | 1 684 531 A2 | 7/2006 |
| JP | 2002344800 A | 11/2002 |
| JP | 201398877 A | 5/2013 |
| KR | 1020100112840 | 10/2010 |
| WO | 2010029040 A2 | 3/2010 |

OTHER PUBLICATIONS

"International Search Report" dated Sep. 29, 2014 for International application No. PCT/CN2014/081674, International filing date: Jul. 4, 2014.

"International Search Report" dated Oct. 15, 2014 for International application No. PCT/CN2014/081671, International filing date: Jul. 4, 2014.

Chia-Ming Cheng et al., Title: On-Line Stereo Camera Calibration Device and Method For Generating Stereo Camera Parameters, pending U.S. Appl. No. 14/322,930, filed Jul. 3, 2014.

Tsai, A Versatile Camera Calibration Technique for High-Accuracy 3D Machine Vision Metrology Using Off-the-Shelf TV Cameras and Lenses, IEEE Journal of Robotics and Automation, vol. RA-3, No. 4, pp. 323-344, Aug. 1987.

Lowe, Distinctive Image Features from Scale-Invariant Keypoints, International Journal of Computer Vision 60(2), 2004, pp. 91-110, Kluwer Academic Publishers, Manufactured in the Netherlands.

Lucchese, Geometric calibration of digital cameras through multi-view rectification, Image and Vision Computing 23, 2005, pp. 517-539.

\* cited by examiner
† cited by third party

US 10,033,989 B2

SYNCHRONIZATION CONTROLLER FOR MULTI-SENSOR CAMERA DEVICE AND RELATED SYNCHRONIZATION METHOD

CROSS REFERENCE TO RELATED APPLICATIONS

This application claims the benefit of U.S. provisional application No. 61/843,221, filed on Jul. 5, 2013 and incorporated herein by reference.

BACKGROUND

The disclosed embodiments of the present invention relate to generating synchronized image outputs, and more particularly, to a synchronization controller for a multi-sensor camera device (e.g., a stereo camera device) and a related synchronization method.

With the development of science and technology, users are pursing stereoscopic and more real images rather than high quality images. There are two techniques of present stereo image display. One is to use a video output apparatus which collaborates with glasses, such as anaglyph glasses, polarization glasses or shutter glasses, while the other is to directly use a display apparatus without any accompanying glasses. No matter which technique is utilized, the main theory of stereo image display is to make the left eye and the right eye see different images (i.e., one left-view image and one right-view image). Hence, the brain will regard the different images seen from two eyes as one stereo image.

A stereo image pair of one left-view image and one right-view image may be obtained by using a stereo camera device. The stereo camera device is a camera that has two image sensors designed to take two pictures. The stereo image pair, including one left-view image and one right-view image, therefore creates the three-dimensional (3D) effect when viewed by the user. However, there may be a problem that the left-view image and the right-view image generated from the stereo camera device are not synchronized with each other. As a result, when the non-synchronized left-view image and right-view image are displayed on a 3D panel of an electronic device (e.g., a smartphone), the user of the electronic device would have a poor 3D viewing experience.

SUMMARY

In accordance with exemplary embodiments of the present invention, a synchronization controller for a multi-sensor camera device (e.g., a stereo camera device) and a related synchronization method are proposed to solve the above-mentioned problem.

According to a first aspect, an exemplary synchronization controller for a multi-sensor camera device is disclosed. The exemplary synchronization controller includes a detection circuit and a control circuit. The detection circuit is configured to detect asynchronization between image outputs generated from the multi-sensor camera device, wherein the image outputs correspond to different viewing angles. The control circuit is configured to control an operation of the multi-sensor camera device in response to the asynchronization detected by the detection circuit.

According to a second aspect of the present invention, an exemplary synchronization method applied to a multi-sensor camera device is disclosed. The exemplary synchronization method includes: detecting asynchronization between image outputs generated from the multi-sensor camera device, wherein the image outputs correspond to different viewing angles; and controlling an operation of the multi-sensor camera device in response to the detected asynchronization.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One concept of the present invention is to control an operation of a multi-sensor camera device to adjust the time difference between image outputs generated from the multi-sensor camera device, thereby reducing/cancelling the asynchronization between image outputs that are provided to a following image processing stage for further processing. The proposed synchronization mechanism for a multi-sensor camera device is capable of relaxing the sensor specification requirement. For one example, each image sensor of the multi-sensor camera device is allowed to have a fixed timing delay between the sensor start-up and the first pulse of a vertical synchronization signal generated from the image sensor. For another example, there is no requirement for a dedicated synchronization mechanism between two image sensors of the multi-sensor camera device, such as a master-slave control mechanism using synchronization pins of two image sensors of the multi-sensor camera device. Basically, with the help of the proposed synchronization mechanism, two or more arbitrary single-lens image sensors can achieve the desired image output synchronization. Further, since no line buffer or frame buffer is needed for achieving the image output synchronization, the proposed synchronization mechanism for a multi-sensor camera device is a low-cost solution. Further details of the proposed synchronization mechanism for a multi-sensor camera device are described as below.

Figure 1:
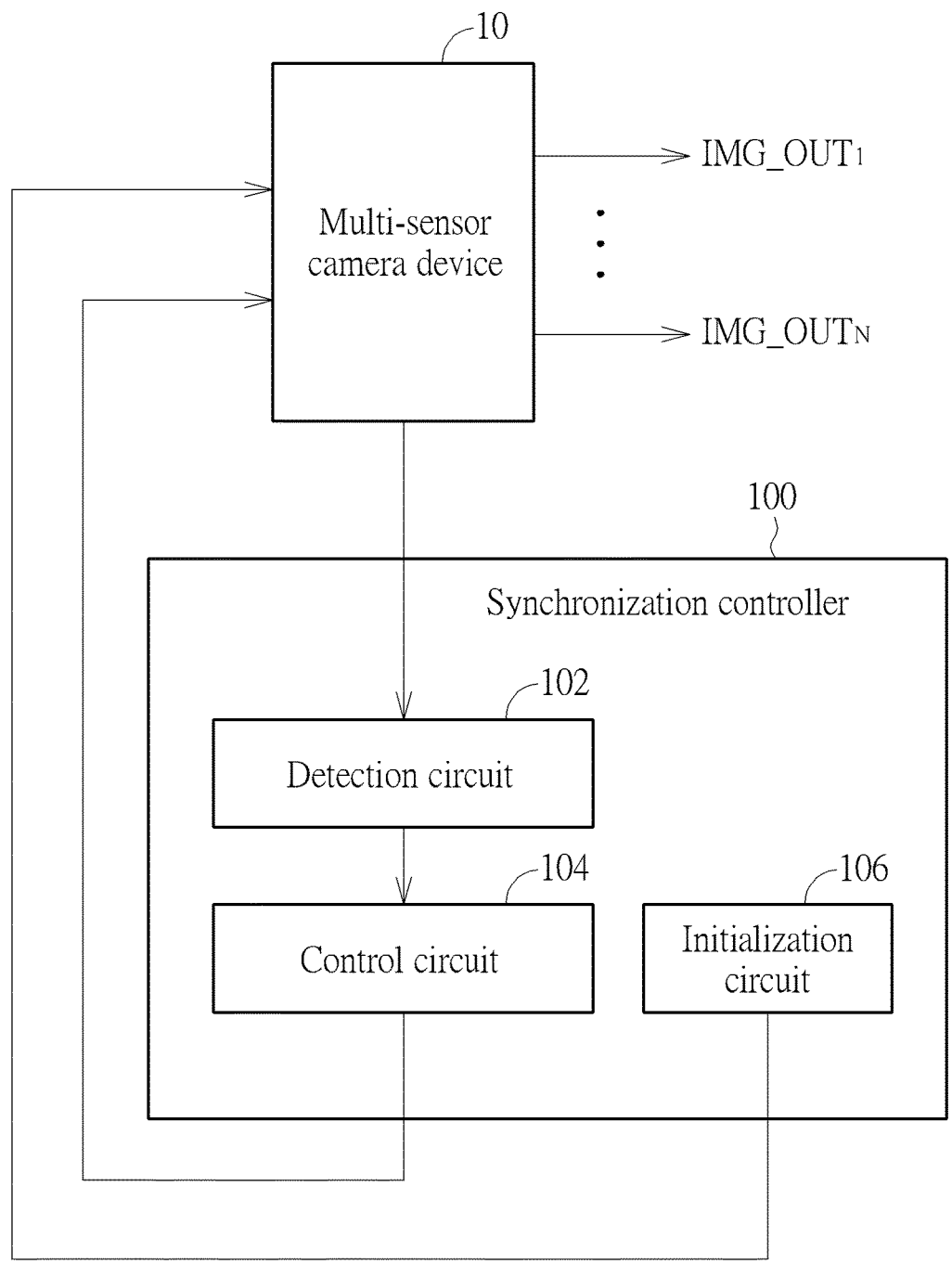
FIG. 1 is a block diagram illustrating a synchronization controller according to an embodiment of the present invention.

FIG. 1 is a block diagram illustrating a synchronization controller according to an embodiment of the present invention. The synchronization controller 100 is configured to control a multi-sensor camera device 10 for reducing/cancelling image output asynchronization of the multi-sensor camera device 10. The multi-sensor camera device 10 may be configured to generate a plurality of image outputs IMG_OUT$_1$-IMG_OUT$_N$ corresponding to different viewing angles. For example, when the multi-sensor camera device 10 is operated in a video recording mode, each of the image outputs IMG_OUT$_1$-IMG_OUT$_N$ would have a sequence of frames (i.e., captured images).

In regard to the synchronization controller 100, it may include a detection circuit 102, a control circuit 104 and an optional initialization circuit 106 according to an embodiment of the present invention. In this embodiment, the detection circuit 102 is configured to detect asynchronization between image outputs IMG_OUT$_1$-IMG_OUT$_N$ generated from the multi-sensor camera device 10. The control circuit 104 is coupled between the detection circuit 102 and the multi-sensor camera device 10, and configured to control an operation of the multi-sensor camera device 10 in response to the asynchronization detected by the detection circuit 102 to thereby adjust the output timing of at least one of the image outputs IMG_OUT$_1$-IMG_OUT$_N$. In this way, the asynchronization between image outputs IMG_OUT$_1$-IMG_OUT$_N$ can be reduced or canceled through a proper control applied to the multi-sensor camera device 10.

It should be noted that the number of image outputs with different viewing angles may depend on the number of image sensors implemented in the multi-sensor camera device 10. Further, the present invention has no limitation on the number of image sensors included in the multi-sensor camera device 10. In other words, the number of image sensors included in the multi-sensor camera device 10 may vary, depending upon actual design consideration. Hence, the proposed synchronization mechanism may be applied to any camera device with more than one image sensor. For example, when the multi-sensor camera device 10 is a stereo camera device with two image sensors, an image output generated from one image sensor is a left-view image output, and an image output generated from the other image sensor is a right-view image output. Hence, the synchronization controller 100 can be used to make the left-view image output synchronized with the right-view image output, thus allowing the user to have a better 3D viewing experience when the left-view image output and the right-view image output are displayed on a 3D panel of an electronic device (e.g., a smartphone).

Figure 2:
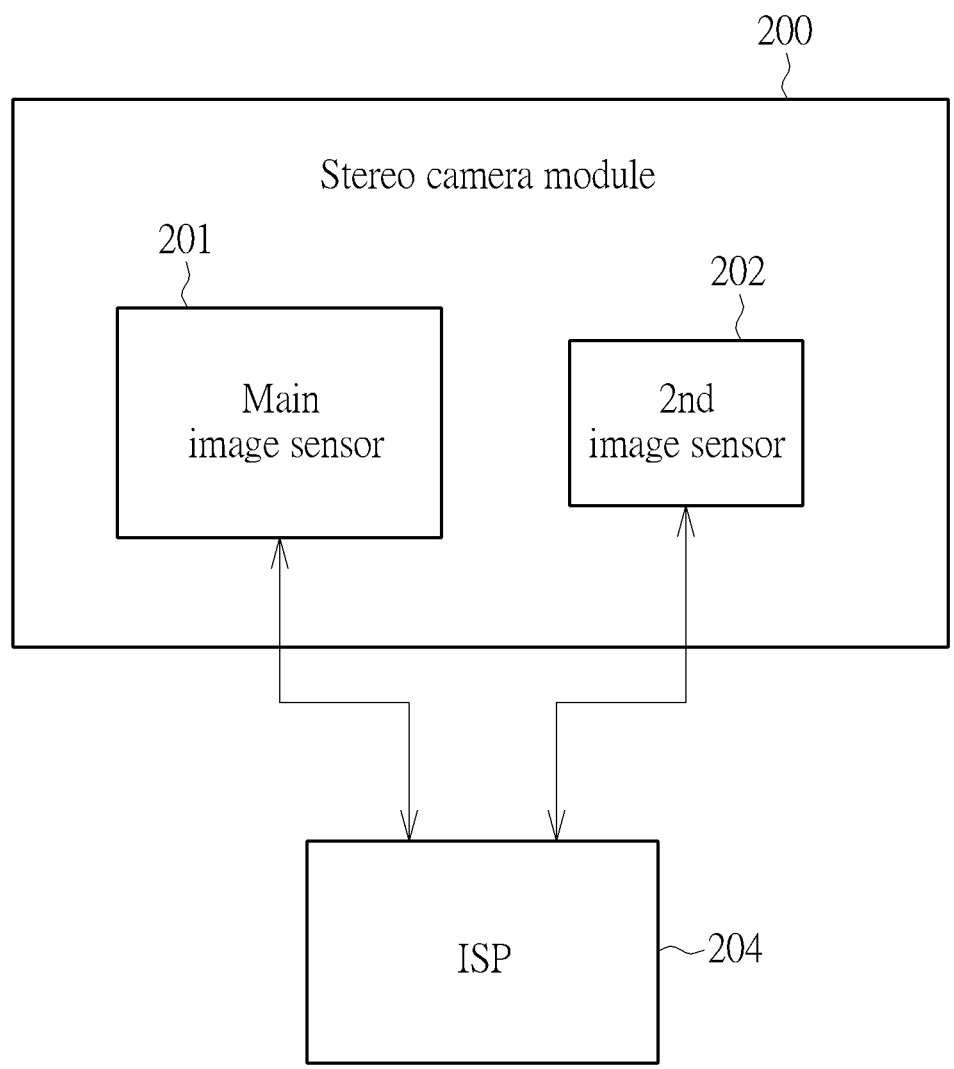
FIG. 2 is a diagram illustrating a stereo camera module with two asymmetric image sensors.
Figure 3:
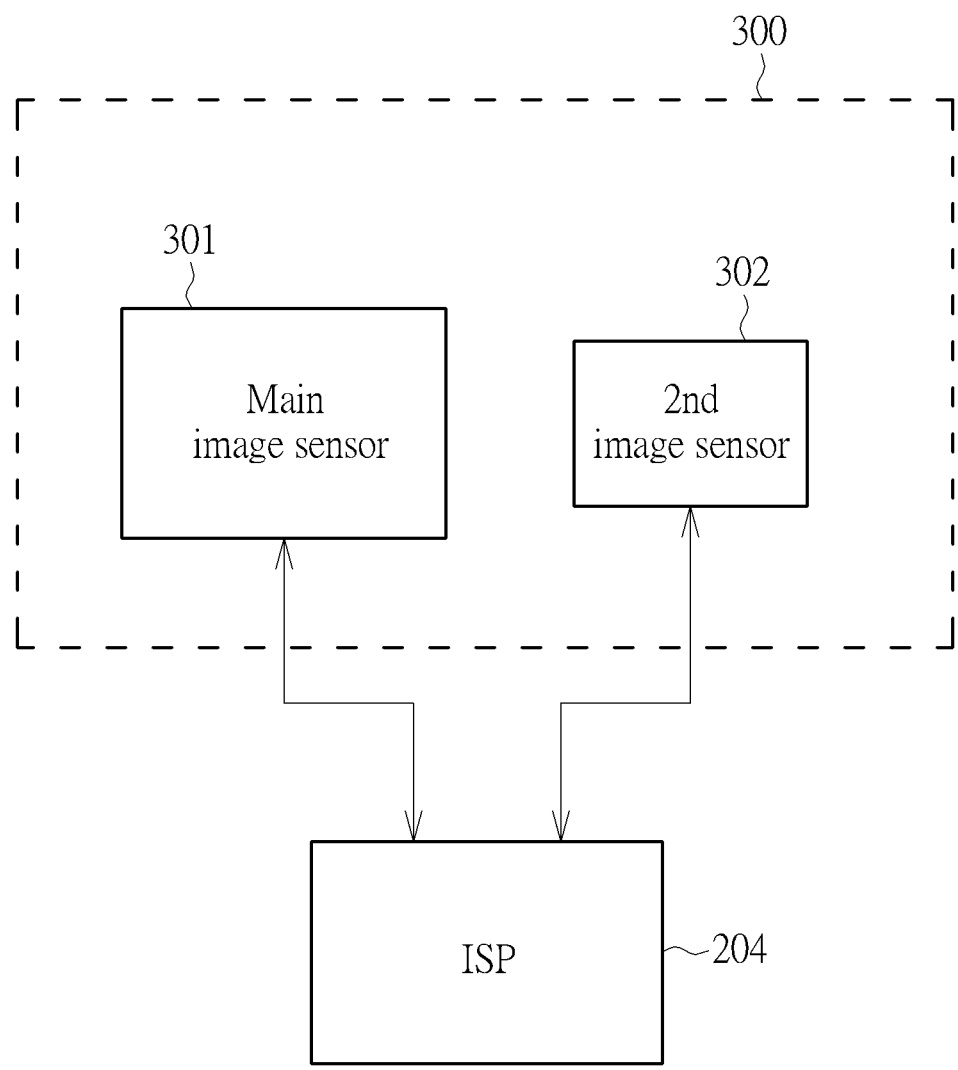
FIG. 3 is a diagram illustrating a module-free stereo camera having two asymmetric image sensors.

For clarity and simplicity, the following assumes that the multi-sensor camera device 10 is a stereo camera device with two image sensors. However, this is for illustrative purposes only, and is not meant to be a limitation of the present invention. By way of example, the multi-sensor camera device 10 may be implemented using a stereo camera module 200 with two asymmetric image sensors, including a main image sensor 201 and a second (auxiliary) image sensor 202 (i.e., image sensors with different resolutions and/or different sensor types), as shown in FIG. 2. In one embodiment, when the stereo camera module 200 is installed in an electronic device (e.g., a mobile phone), the stereo camera module 200 may be connected to an image signal processor (ISP) 204 with a bridge circuit integrated therein. Hence, no external bridge integrated circuit (IC) coupled between an ISP and image sensors of a stereo camera module is needed. Alternatively, the multi-sensor camera device 10 may be implemented using a module-free stereo camera 300 having two asymmetric image sensors, including a main image sensor 301 and a second (auxiliary) image sensor 302 (i.e., individual single-lens image sensors with different resolutions and/or different sensor types that are separately provided without being packed as one stereo camera module), as shown in FIG. 3. It should be noted that the main image sensor 301 and the second (auxiliary) image sensor 302 may be supplied from different module houses. In one embodiment, when the module-free stereo camera 300 is installed in an electronic device (e.g., a mobile phone), the module-free stereo camera 300 may be connected to an ISP 204 with a bridge circuit integrated therein. Hence, no external bridge IC coupled between an ISP and individual image sensors is needed.

No matter whether the multi-sensor camera device 10 is implemented using the stereo camera module 200 shown in FIG. 2 or the module-free stereo camera 300 shown in FIG. 3, the asymmetric image sensors may have different frame rates or dynamic frame rates. The difference between the frame rates would cause asynchronization between the left-view image output and the right-view image output. In an exemplary design, the synchronization controller 100 may be implemented in the ISP 204. Hence, the synchronization controller 100 may be employed to detect and measure the asynchronization between the left-view image output and the right-view image output, and then control the asymmetric dual image sensors to reduce or cancel the detected asynchronization between the left-view image output and the right-view image output.

Figure 4:
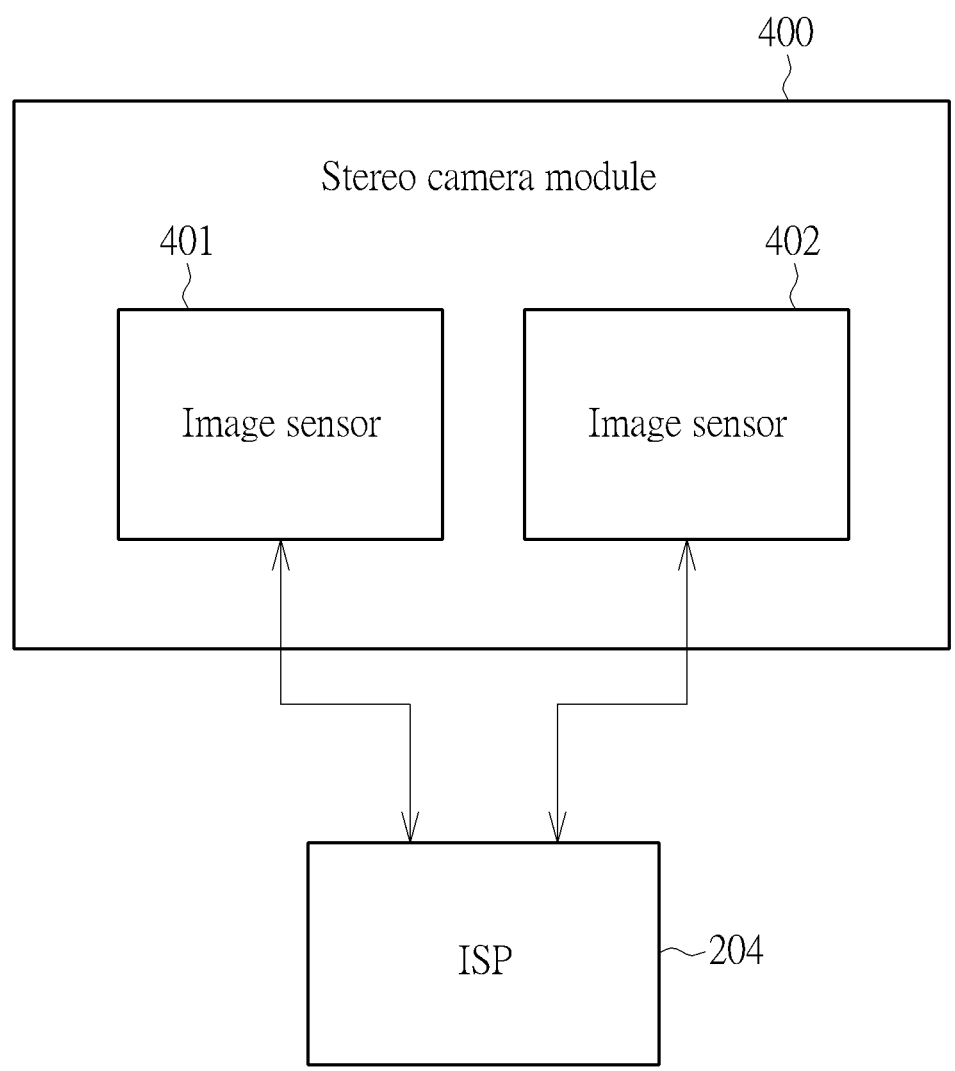
FIG. 4 is a diagram illustrating a stereo camera module with two symmetric image sensors.
Figure 5:
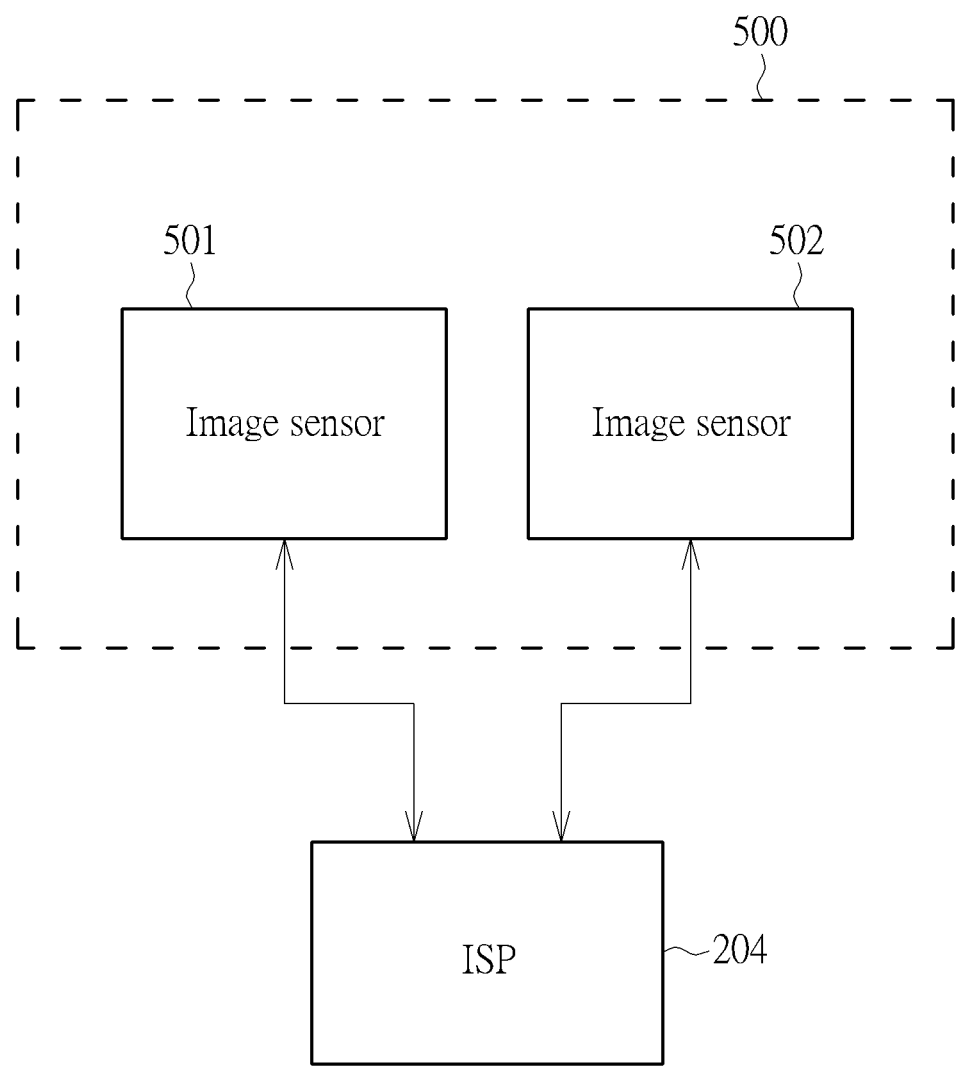
FIG. 5 is a diagram illustrating a module-free stereo camera having two symmetric image sensors.

It should be noted that using the synchronization controller 100 for solving the output image asynchronization problem encountered by the multi-sensor camera device 10 implemented by the stereo camera module 200 or the module-free stereo camera 300 is merely one example. Alternatively, the synchronization controller 100 may be employed for solving the image output asynchronization problem encountered by a stereo camera device with symmetric image sensors. That is, the multi-sensor camera device 10 may be implemented using a stereo camera module 400 with two symmetric image sensors 401 and 402 (i.e., image sensors with the same resolution), as shown in FIG. 4, or may be implemented using a module-free stereo camera 500 having two symmetric image sensors 501 and 502 (i.e., individual single-lens image sensors with the same resolution that are separately provided without being packed as one stereo camera module), as shown in FIG. 5. It should be noted that the image sensors 501 and 502 may be supplied from different module houses. These alternative designs all fall within the scope of the present invention.

The detection circuit 102 may detect the asynchronization between image outputs IMG_OUT$_1$-IMG_OUT$_N$ generated from the multi-sensor camera device 10 (e.g., one left-view image output and one right-view image output generated from one of the stereo cameras shown in FIG. 2-FIG. 5) according to vertical synchronization signals generated from the multi-sensor camera device 10, where the vertical synchronization signals are associated with the image outputs IMG_OUT$_1$-IMG_OUT$_N$, respectively. Further, based on information of the detected asynchronization provided by the detection circuit 102, the control circuit 104 may control the multi-sensor camera device 10 by adjusting a master clock, a pixel clock, a sensor dummy line setting, and/or a sensor dummy pixel setting. For better understanding of the technical features of the present invention, an example of synchronization controller 100 and multi-sensor camera device 10 used in an electronic device is given as below.

Figure 6:
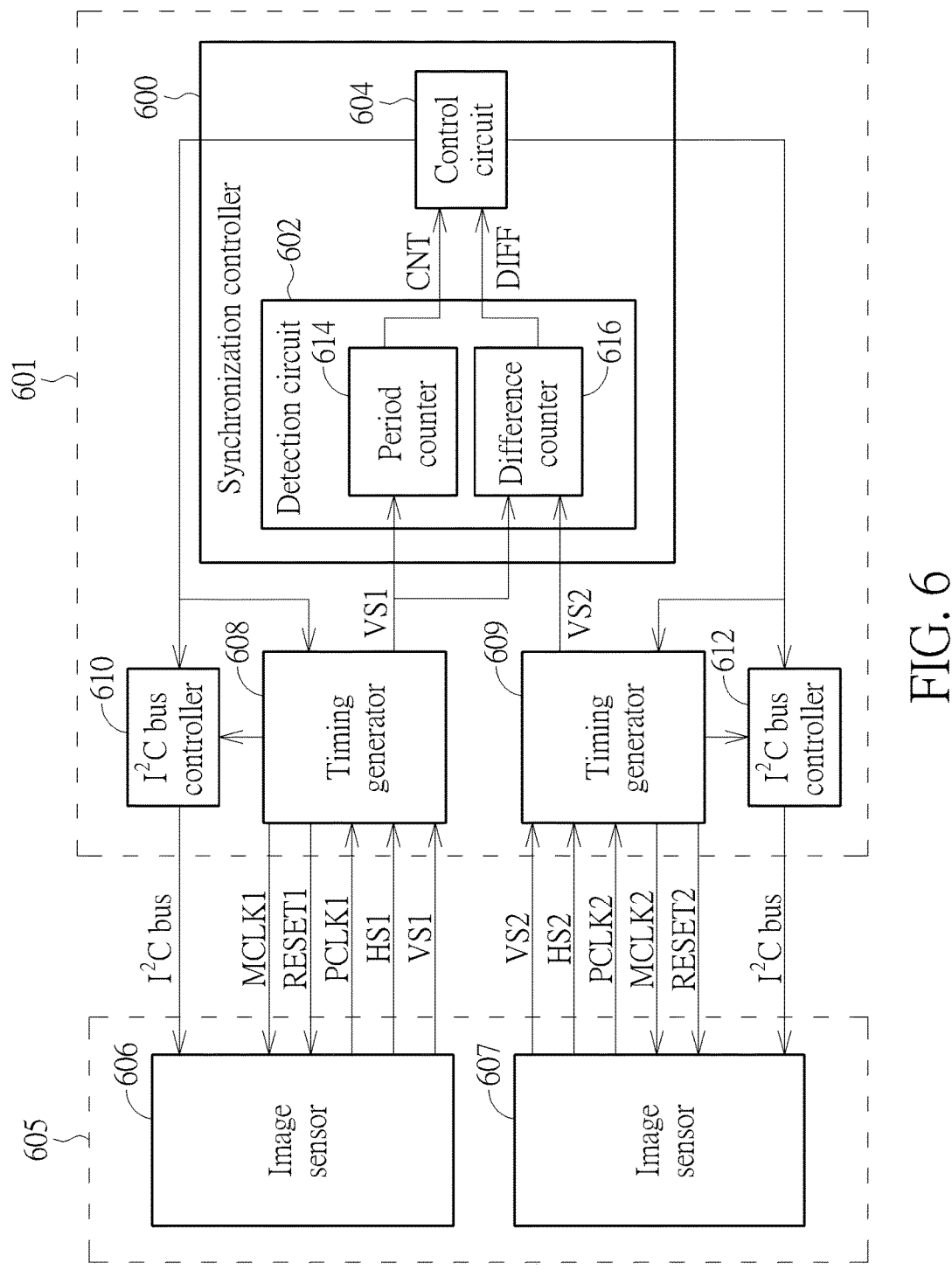
FIG. 6 is a block diagram illustrating a synchronization controller according to another embodiment of the present invention.

FIG. 6 is a block diagram illustrating a synchronization controller according to another embodiment of the present invention. The synchronization controller 600 follows the architecture of the synchronization controller 100 shown in FIG. 1, and therefore includes a detection circuit 602 and a control circuit 604. In this embodiment, the synchronization controller 600 may be implemented in an image signal processor (ISP) 601 of a baseband chip of a mobile phone. However, this is not meant to be a limitation of the present invention. The synchronization controller 600 is employed to solve the image output asynchronization problem encountered by a multi-sensor camera device (e.g., a stereo camera device 605 in this embodiment). The stereo camera device 605 may be implemented using one of the exemplary camera designs shown in FIG. 2-FIG. 5, and may have two image sensors 606 and 607. Hence, the asynchronization between a left-view image output and a right-view image output generated from the image sensors 606 and 607 can be reduced or canceled due to a proper camera control performed upon the stereo camera device 605.

As shown in FIG. 6, the ISP 601 further includes timing generators 608, 609 and I²C (Inter-Integrated Circuit) bus controllers 610, 612. The timing generator 608 may generate a sensor reset signal RESET1 to reset the image sensor 606, and supply a master clock MCLK1 to the image sensor 606 to act as a reference clock. Hence, the image sensor 606 performs a sensor start-up operation when triggered by the sensor reset signal RESET1. In addition, the image sensor 606 may include a frequency synthesizer used for generating a pixel clock PCLK1 based on the master clock MCLK1. The image sensor 606 outputs pixel data of each frame in an image output (e.g., one of a left-view image output and a right-view image output) according to the pixel clock PCLK1. The image sensor 606 further transmits the pixel clock PCLK1, a horizontal synchronization signal HS1, and a vertical synchronization (Vsync) signal VS1 to the timing generator 608 of the ISP 601 through a camera interface. For example, the camera interface may be a camera serial interface (CSI) standardized by a Mobile Industry Processor Interface (MIPI). The horizontal synchronization signal HS1 and the vertical synchronization signal VS1 are associated with the image output of the image sensor 606, where the horizontal synchronization signal HS1 indicates an end of transmission of each line in a frame generated from the image sensor 606, and the vertical synchronization signal VS1 indicates an end of transmission of the last line in a frame generated from the image sensor 606.

Similarly, the timing generator 609 may generate a sensor reset signal RESET2 to reset the image sensor 607, and supply a master clock MCLK2 to the image sensor 607 to act as a reference clock. Hence, the image sensor 607 performs a sensor start-up operation when triggered by the sensor reset signal RESET2. In addition, the image sensor 607 may include a frequency synthesizer used for generating a pixel clock PCLK2 based on the master clock MCLK2. The image sensor 607 outputs pixel data of each frame in an image output (e.g., the other of the left-view image output and the right-view image output) according to the pixel clock PCLK2. The image sensor 607 further transmits the pixel clock PCLK2, a horizontal synchronization signal HS2, and a vertical synchronization signal VS2 to the timing generator 609 of the ISP 601 through a camera interface. For example, the camera interface may be a camera serial interface (CSI) standardized by a Mobile Industry Processor Interface (MIPI). The horizontal synchronization signal HS2 and the vertical synchronization signal VS2 are associated with the image output of the image sensor 607, where the horizontal synchronization signal HS2 indicates an end of transmission of each line in a frame generated from the image sensor 607, and the vertical synchronization signal VS2 indicates an end of transmission of the last line in a frame generated from the image sensor 607.

The vertical synchronization signal VS1 is a way to indicate that an entire frame generated from the image sensor 606 has been transmitted to the ISP 601 via the camera interface. Similarly, the vertical synchronization signal VS2 is a way to indicate that an entire frame generated from the image sensor 607 has been transmitted to the ISP 601 via the camera interface. In this embodiment, the detection circuit 602 is configured to detect asynchronization between image outputs of the stereo camera device 605 according to the vertical synchronization signals VS1 and VS2 generated from the stereo camera device 605, where each of the vertical synchronization signals VS1 and VS2 has Vsync pulses each indicative an end of a current frame and a start of a next frame. As shown in FIG. 6, the detection circuit 602 includes, but not limited to, a period counter 614 and a difference counter 616. The period counter 614 is configured to count a period between two successive Vsync pulses in the same vertical synchronization signal (e.g., VS1 in this example), and accordingly generate a count value CNT. The difference counter 616 is configured to count a time difference between two successive Vsync pulses, including a Vsync pulse in one vertical synchronization signal (e.g., VS1 in this example) and a Vsync pulse in another vertical synchronization signal (e.g., VS2 in this example), and accordingly generate a count value DIFF. The count values CNT and DIFF provide information of the detected asynchronization between image outputs of the stereo camera device 605.

Figure 7:
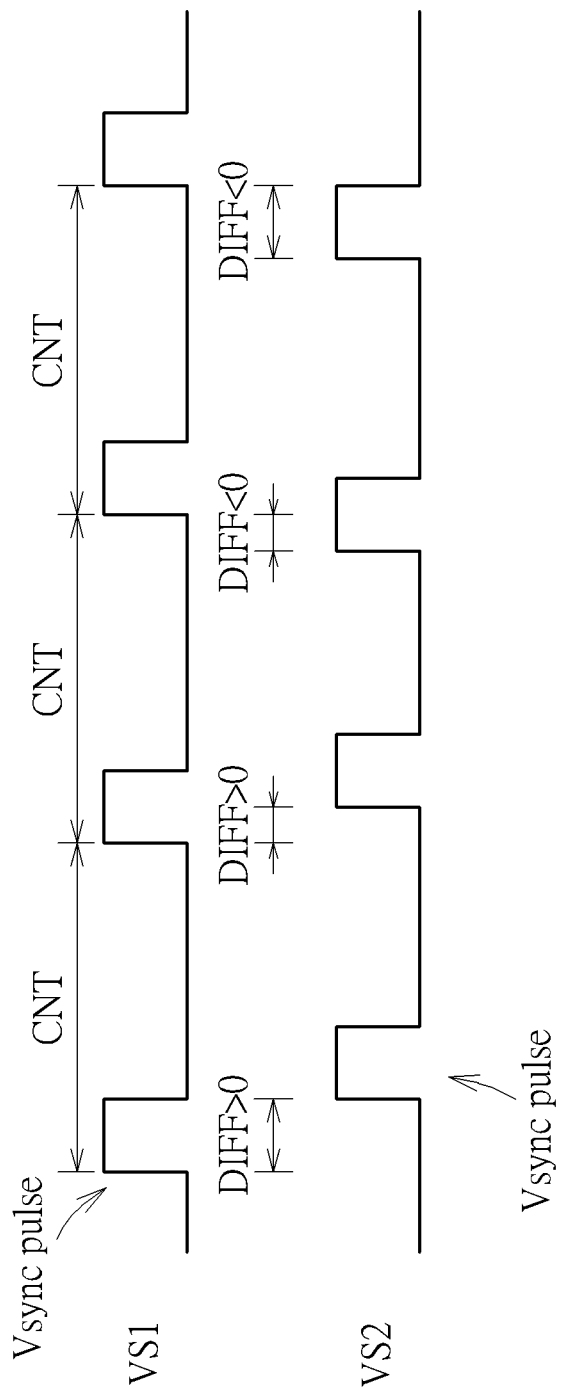
FIG. 7 is a timing diagram illustrating the timing relationship between vertical synchronization signals generated from image sensors shown in FIG. 6.

FIG. 7 is a timing diagram illustrating the timing relationship between the vertical synchronization signals VS1 and VS2 generated from the image sensors 606 and 607 shown in FIG. 6. In one exemplary design, the difference counter 616 may be configured to generate the count value DIFF with a positive value when the difference counter 616 is sequentially triggered by the Vsync pulse in the vertical synchronization signal VS1 and the Vsync pulse in the vertical synchronization signal VS2, and generate the count value DIFF with a negative value when the difference counter 616 is sequentially triggered by the Vsync pulse in the vertical synchronization signal VS2 and the Vsync pulse in the vertical synchronization signal VS1. The control circuit 604 may be configured to compare the count values DIFF and CNT to decide the actual phase leading/lagging status between Vsync pulses of the vertical synchronization signals VS1 and VS2 that are monitored by the difference counter 616. When $$|DIFF| \le \frac{1}{2} \cdot CNT \text{ and } DIFF > 0,$$

the control circuit 604 may judge that the phase of the vertical synchronization signal VS1 leads the phase of the vertical synchronization signal VS2 by |DIFF|. When $$|DIFF| \le \frac{1}{2} \cdot CNT \text{ and } DIFF < 0,$$

the control circuit 604 may judge that the phase of the vertical synchronization signal VS1 lags behind the phase of the vertical synchronization signal VS2 by |DIFF|. When $$|DIFF| > \frac{1}{2} \cdot CNT \text{ and } DIFF > 0,$$

the control circuit 604 may judge that the phase of the vertical synchronization signal VS2 leads the phase of the vertical synchronization signal VS1 by |DIFF|. When $$|DIFF| > \frac{1}{2} \cdot CNT \text{ and } DIFF < 0,$$

the control circuit 604 judges that the phase of the vertical synchronization signal VS2 lags behind the phase of the vertical synchronization signal VS1 by |DIFF|.

Based on the asynchronization information given by the detection circuit 602, the control circuit 604 controls the operation of the stereo camera device 605 to reduce or cancel the asynchronization between the image outputs generated from the stereo camera device 605. More specifically, the magnitude of the measured time different |DIFF| is indicative of the asynchronization between the image outputs generated from the stereo camera device 605. After the actual phase leading/lagging status between Vsync pulses of the vertical synchronization signals VS1 and VS2 is decided, the phase leading/lagging status between the image outputs generated from the stereo camera device 605 is known. Hence, based on the asynchronization information provided by the detection circuit 602, the control circuit 604 controls the operation of the stereo camera device 605 to make one image output catch up the other image output. For example, when |DIFF| is larger than a particular threshold, meaning that the asynchronization between the left-view image output and the right-view image output of the stereo camera device 605 exceeds a tolerable level, the control circuit 604 is operative to reduce or cancel the asynchronization between the left-view image output and the right-view image output of the stereo camera device 605. To put it another way, when a time difference between a current left-view image and a current right-view image is detected by the detection circuit 602, the control circuit 604 may control the operation of the stereo camera device 605 to make a next left-view image and a next right-view image transmitted from the stereo camera device 605 to the ISP 601 at the same time or have a time difference smaller than the time difference between the current left-view image and the current right-view image.

During an active period of the stereo camera device 605, the phase leading/lagging status between the image outputs generated from the stereo camera device 605 is time-variant. As shown in FIG. 7, the phase relation between the vertical synchronization signals VS1 and VS2 is not fixed. More specifically, considering a case where the image sensors 606 and 607 have different frame rates or dynamic frame rates, the phase of the image output generated from the image sensor 606 does not always lead (or lag behind) the phase of the image output generated from the image sensor 607. Even though transmission of a current frame generated from the image sensor 606 is synchronized with transmission of a current frame generated from the image sensor 607 under a proper camera control made by the synchronization controller 600, transmission of a next frame generated from the image sensor 606 is not guaranteed to be synchronized with transmission of a next frame generated from the image sensor 607. Hence, the detection circuit 602 may keep monitoring the phase leading/lagging status between the image outputs generated from the stereo camera device 605. Based on the information given by the preceding detection circuit 614, the synchronization controller 600 may dynamically/adaptively control the stereo camera device 605 to reduce or cancel any detected asynchronization between the image outputs generated from the stereo camera device 605.

It should be noted that any factor that can affect the image output timing of the stereo camera device 605 may be adjusted under the control of the control circuit 604 to achieve the objective of reducing or cancelling the asynchronization between the left-view image output and the right-view image output of the stereo camera device 605. Several exemplary designs are given as below.

In a first exemplary design, the control circuit 604 controls at least one of the timing generators 608 and 609 to adjust at least one master clock supplied to at least one image sensor. In other words, the control circuit 604 controls the stereo camera device 605 by adjusting master clock(s) according to the asynchronization (e.g., |DIFF|) detected by the detection circuit 602. Since the pixel clock PCLK1/PCLK2 used by the image sensor 606/607 is derived from the master clock MCLK1/MCLK2 provided by the timing generator 608/609, adjusting the phase of the master clock MCLK1/MCLK2 would affect the phase of the pixel clock PCLK1/PCLK2. In this way, the output timing of an image output transmitted based on an adjusted pixel clock can be adjusted. For one example, when the control circuit 604 judges that the phase of the vertical synchronization signal VS1 leads the phase of the vertical synchronization signal VS2, the phase of the master clock MCLK1 may be delayed, and/or the phase of the master clock MCLK2 may be advanced. For another example, when the control circuit 604 judges that the phase of the vertical synchronization signal VS1 lags behind the phase of the vertical synchronization signal VS2, the phase of the master clock MCLK1 may be advanced, and/or the phase of the master clock MCLK2 may be delayed.

In a second exemplary design, the control circuit 604 controls at least one of the image sensors 606 and 607 through at least one of the I²C controllers 610 and 612. More specifically, based on the asynchronization (e.g., |DIFF|) detected by the detection circuit 602, the control circuit 604 may transmit a control command to adjust the pixel clock PCLK1 of the image sensor 606 via one I²C bus, and/or transmit a control command to adjust the pixel clock PCLK2 of the image sensor 607 via another I²C bus. In this way, the output timing of an image output transmitted based on an adjusted pixel clock can be adjusted. For one example, when the control circuit 604 judges that the phase of the vertical synchronization signal VS1 leads the phase of the vertical synchronization signal VS2, the phase of the pixel clock PCLK1 may be delayed, and/or the phase of the pixel clock PCLK2 may be advanced. For another example, when the control circuit 604 judges that the phase of the vertical synchronization signal VS1 lags behind the phase of the vertical synchronization signal VS2, the phase of the pixel clock PCLK1 may be advanced, and/or the phase of the pixel clock PCLK2 may be delayed.

In a third exemplary design, the control circuit 604 controls at least one of the image sensors 606 and 607 through at least one of the I²C controllers 610 and 612. More specifically, based on the asynchronization (e.g., |DIFF|) detected by the detection circuit 602, the control circuit 604 may transmit a control command to adjust the sensor dummy line setting of the image sensor 606 via one I²C bus, and/or transmit a control command to adjust the sensor dummy line setting of the image sensor 607 via another I²C bus. One frame may include regular lines and dummy lines. Hence, the exposure time of one frame may be adjusted by changing the number of dummy lines. Specifically, it is possible to increase the exposure time at the cost of the frame rate by adding dummy lines, where a dummy line lasts for the same time as a regular line, but no pixel data is transferred. The sensor dummy line setting decides how many dummy lines are enabled during the exposure of a corresponding image sensor. In this way, the output timing of an image output generated based on an exposure time affected by an adjusted sensor dummy line setting can be adjusted. For one example, when the control circuit 604 judges that the phase of the vertical synchronization signal VS1 leads the phase of the vertical synchronization signal VS2, the number of dummy lines of the image sensor 606 may be increased, and/or the number of dummy lines of the image sensor 607 may be decreased. For another example, when the control circuit 604 judges that the phase of the vertical synchronization signal VS1 lags behind the phase of the vertical synchronization signal VS2, the number of dummy lines of the image sensor 606 may be decreased, and/or the number of dummy lines of the image sensor 607 may be increased.

In a fourth exemplary design, the control circuit 604 controls at least one of the image sensors 606 and 607 through at least one of the I²C controllers 610 and 612. More specifically, based on the asynchronization (e.g., |DIFF|) detected by the detection circuit 602, the control circuit 604 may transmit a control command to adjust the sensor dummy pixel setting of the image sensor 606 via one I²C bus, and/or transmit a control command to adjust the sensor dummy pixel setting of the image sensor 607 via another I²C bus. Each line of a frame may include regular pixels and dummy pixels. Hence, the exposure time of one frame may be adjusted by changing the number of dummy pixels in each line, where a dummy pixel lasts for the same time as a regular pixel, but no pixel data is transferred. The sensor dummy pixel setting decides how many dummy pixels in each line are enabled during the exposure of a corresponding image sensor. In this way, the output timing of an image output generated based on an exposure time affected by an adjusted sensor dummy pixel setting can be adjusted. For one example, when the control circuit 604 judges that the phase of the vertical synchronization signal VS1 leads the phase of the vertical synchronization signal VS2, the number of dummy pixels of the image sensor 606 may be increased, and/or the number of dummy pixels of the image sensor 607 may be decreased. For another example, when the control circuit 604 judges that the phase of the vertical synchronization signal VS1 lags behind the phase of the vertical synchronization signal VS2, the number of dummy pixels of the image sensor 606 may be decreased, and/or the number of dummy pixels of the image sensor 607 may be increased.

In regard to the exemplary design shown in FIG. 6, the detection circuit 602 and the control circuit 604 are shown as individual circuit blocks. However, at least a portion (i.e., part or all) of the synchronization controller 600 may be integrated within the timing generators 608, 609, depending upon actual design consideration. For example, the period counter 614 may be integrated within the timing generator 608, and the difference counter 616 and the control circuit 604 may be integrated within the timing generator 609.

As mentioned above, the difference counter 616 is used to count a time difference between two successive Vsync pulses, including one Vsync pulse in the vertical synchronization signal VS1 and one Vsync pulse in the vertical synchronization signal VS2. If the inherent start-up characteristics of the image sensors 606 and 607 are not properly considered, it is possible that an initial value of the time difference measured by the difference counter 616 is very large. As a result, the control circuit 604 may fail to effectively reduce the asynchronization between the image outputs of the stereo camera device 605 in a short period of time. To improve the performance of reducing/cancelling the asynchronization between image outputs of the multi-sensor camera device 10, the synchronization controller 100 shown in FIG. 1 may use the initialization circuit 106 to control the start-up timing of image sensors in the multi-sensor camera device 10, such that an initial value of asynchronization between the image outputs is ensured to be within a predetermined range.

By way of example, the initialization circuit 106 may be implemented in the synchronization controller 600 shown in FIG. 6. In one exemplary design, each image sensor 606/607 of the stereo camera device 605 has a fixed timing delay between the sensor start-up and the first Vsync pulse of the vertical synchronization signal VS1/VS2. Further, the fixed timing delays inherently possessed by the image sensors 606 and 607 may be different from each other. Hence, the initialization circuit 106 may be used to control the timing generator 608 to issue the sensor reset signal RESET1 to reset the image sensor 606 at a first time point, and control the timing generator 609 to issue the sensor reset signal RESET2 to reset the image sensor 607 at a second time point. The first time point and the second time point are set based on the fixed timing delays inherently possessed by the image sensors 606 and 607 and the predetermined range. Therefore, the first time point may be different from the second time point, which means that the image sensors 606 and 607 are not required to be triggered by the sensor reset signals RESET1 and RESET2 at the same time. The first time point and the second time point are properly controlled such that an initial value of asynchronization between image outputs of the image sensors 606 and 607 after the image sensors 606 and 607 are reset is within the predetermined range.

For example, the predetermined range may be set based on a nominal frame period (i.e., a nominal transmission time of one frame) $T_{Frame}$ of an image sensor (e.g., 606). Hence, the upper bound of the predetermined range may be set by $$\frac{1}{2} \cdot T_{Frame},$$

and the lower bound of the predetermined range may be set by $$-\frac{1}{2} \cdot T_{Frame}.$$

Please note that this is for illustrative purposes only, and is not meant to be a limitation of the present invention.

In the foregoing embodiments, even though the image sensors in the multi-sensor camera device are independent (e.g., at least one of the pixel clock, data type, resolution and hsync/vsync timing is different between the image sensors), the proposed synchronization mechanism is able to achieve the desired image output synchronization without using additional line buffer or frame buffer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronization controller for a multi-sensor camera device, comprising:
   a detection circuit, configured to detect asynchronization between image outputs generated from the multi-sensor camera device, wherein the image outputs correspond to different viewing angles; and
   a control circuit, configured to dynamically control an operation of the multi-sensor camera device in response to the asynchronization detected by the detection circuit at different time points;
wherein the detection circuit detects different asynchronization values of the asynchronization between the image outputs at the different time points; and the control circuit dynamically controls the operation of the multi-sensor camera device according to each of the different asynchronization values;
wherein the multi-sensor camera device controlled by the synchronization controller has asymmetric image sensors, and the asymmetric image sensors have different resolutions;
wherein the multi-sensor camera device has an image sensor which receives a master clock, and when the asynchronization between the image outputs exists, the control circuit is configured to control the multi-sensor camera device to reduce the asynchronization between the image outputs by adjusting the master clock according to the asynchronization detected by the detection circuit and outputting the adjusted master clock to the image sensor.

2. The synchronization controller of claim 1, wherein the detection circuit is configured to detect the asynchronization according to vertical synchronization signals generated from the multi-sensor camera device; and the vertical synchronization signals are associated with the image outputs, respectively.

3. The synchronization controller of claim 1, wherein the multi-sensor camera device has one image sensor which outputs one of the image outputs according to a pixel clock, and the control circuit is further configured to control the multi-sensor camera device by adjusting a phase of the pixel clock according to the asynchronization detected by the detection circuit.

4. The synchronization controller of claim 1, wherein the multi-sensor camera device has one image sensor which generates one of the image outputs, and the control circuit is further configured to control the multi-sensor camera device by adjusting a sensor dummy line setting of said one image sensor according to the asynchronization detected by the detection circuit.

5. The synchronization controller of claim 1, wherein the multi-sensor camera device has one image sensor which generates one of the image outputs, and the control circuit is further configured to control the multi-sensor camera device by adjusting a sensor dummy pixel setting of said one image sensor according to the asynchronization detected by the detection circuit.

6. The synchronization controller of claim 1, wherein the multi-sensor camera device has a first image sensor for generating a first image output of the image outputs and a second image sensor for generating a second image output of the image outputs, the first image sensor is reset by a first sensor reset signal, the second image sensor is reset by a second sensor reset signal, and the synchronization controller further comprises:
   an initialization circuit, configured to control timing of issuing the first sensor reset signal and timing of issuing the second sensor reset signal to ensure that an initial value of asynchronization between the first image output and the second image output after the first image sensor and the second image sensor are reset is within a predetermined range.

7. The synchronization controller of claim 1, wherein the multi-sensor camera device is a camera module having the asymmetric image sensors packed therein.

8. The synchronization controller of claim 1, wherein the multi-sensor camera device is module-free.

9. A synchronization method applied to a multi-sensor camera device, comprising:
   detecting asynchronization between image outputs generated from the multi-sensor camera device, wherein the image outputs correspond to different viewing angles; and
   dynamically controlling an operation of the multi-sensor camera device in response to the detected asynchronization obtained at different time points;
   wherein the step of detecting the asynchronization between the image outputs comprises:
   detecting different asynchronization values of the asynchronization between the image outputs at the different time points; and
   the step of dynamically controlling the operation of the multi-sensor camera device comprises:
   dynamically controlling the operation of the multi-sensor camera device according to each of the different asynchronization values;
   wherein the multi-sensor camera device has asymmetric image sensors, and the asymmetric image sensors have different resolutions;
   wherein the multi-sensor camera device has an image sensor which receives a master clock, and the step of dynamically controlling the operation of the multi-sensor camera device further comprises:
   when the asynchronization between the image outputs exists, reducing the asynchronization between the image outputs by adjusting the master clock according to the detected asynchronization, and outputting the adjusted master clock to the image sensor.

10. The synchronization method of claim 9, wherein the step of detecting the asynchronization between the image outputs generated from the multi-sensor camera device comprises:
    detecting the asynchronization according to vertical synchronization signals generated from the multi-sensor camera device, wherein the vertical synchronization signals are associated with the image outputs, respectively.

11. The synchronization method of claim 9, wherein the multi-sensor camera device has one image sensor which outputs one of the image outputs according to a pixel clock, and the step of dynamically controlling the operation of the multi-sensor camera device further comprises:
    adjusting a phase of the pixel clock according to the detected asynchronization.

12. The synchronization method of claim 9, wherein the multi-sensor camera device has one image sensor which generates one of the image outputs, and the step of dynamically controlling the operation of the multi-sensor camera device further comprises:

adjusting a sensor dummy line setting of said one image sensor according to the detected asynchronization.

13. The synchronization method of claim 9, wherein the multi-sensor camera device has one image sensor which generates one of the image outputs, and the step of dynamically controlling the operation of the multi-sensor camera device further comprises:

adjusting a sensor dummy pixel setting of said one image sensor according to the detected asynchronization.

14. The synchronization method of claim 9, wherein the multi-sensor camera device has a first image sensor for generating a first image output of the image outputs and a second image sensor for generating a second image output of the image outputs, the first image sensor is reset by a first sensor reset signal, the second image sensor is reset by a second sensor reset signal, and the synchronization method further comprises:

controlling timing of issuing the first sensor reset signal and timing of issuing the second sensor reset signal to ensure that an initial value of asynchronization between the first image output and the second image output after the first image sensor and the second image sensor are reset is within a predetermined range.

15. The synchronization method of claim 9, wherein the multi-sensor camera device is a camera module having the asymmetric image sensors packed therein.

16. The synchronization method of claim 9, wherein the multi-sensor camera device is module-free.

\* \* \* \* \*